United States Patent [19]

Oliver

[11] E Re. 30,243

[45] Reissued Apr. 1, 1980

[54] PADLOCK CLOSURE

[75] Inventor: Roy N. Oliver, Salem, Va.

[73] Assignee: Medeco Security Locks, Inc., Salem, Va.

[21] Appl. No.: 940,240

[22] Filed: Sep. 7, 1978

Related U.S. Patent Documents

Reissue of:

[64] Patent No.: 4,063,435
Issued: Dec. 20, 1977
Appl. No.: 728,787
Filed: Oct. 1, 1976

[51] Int. Cl.[2] ..... E05B 27/24

[52] U.S. Cl. ..... 70/38 A; 70/52

[58] Field of Search ..... 70/38 R, 38 A, 38 B, 70/38 C, 52, 53, 51, 367, 368

[56] References Cited

U.S. PATENT DOCUMENTS

| | | | |
|---|---|---|---|
| 824,593 | 6/1906 | Schroeder | 70/38 A |
| 1,683,985 | 9/1928 | Muzzio | 70/38 B |
| 3,710,603 | 1/1973 | Miller | 70/38 A |
| 3,713,309 | 1/1973 | Miller | 70/38 A |

*Primary Examiner*—Robert L. Wolfe

*Attorney, Agent, or Firm*—Sughrue, Rothwell, Mion, Zinn and Macpeak

[57] ABSTRACT

A closure for a padlock body containing a removably fixed lock cylinder primarily comprising a circular member having a concave recess in its perimeter coacting with the shorter leg of the padlock's shackle at the top of the padlock, the underside of the said member having a bayonet-like latch preventing the member from being withdrawn from the top of the padlock via coacting with the interior of the padlock body wherein the aforesaid lock cylinder is enclosed unless the member is rotated a predetermined amount, and the rotation of the member being prevented by the said leg of the shackle being in its proper socket in the body of the padlock in its locked position. The keyway to the lock cylinder for locking and unlocking the padlock is in the bottom of the padlock extending into the padlock body as is well known in the art.

1 Claim, 4 Drawing Figures

PADLOCK CLOSURE

Matter enclosed in heavy brackets [ ] appears in the original patent but forms no part of this reissue specification; matter printed in italics indicates the additions made by reissue.

BACKGROUND OF THE INVENTION

Padlocks used with hasps and staples are well known in the art, and are continually being improved. One direction in which such improvements are made is in the use of high security lock cylinders enclosed within the body of the padlock such as are described and shown in U.S. Pat. Nos. 3,499,302 and 3,722,240. Normally such lock cylinders are replaceably fixed in high security padlocks in a manner so that they may be changed in the event that keys become lost or stolen without having to replace the entire padlock.

In replacing lock cylinders in high security padlocks problems arise in connection with securely enclosing the lock cylinder within the padlock body. One method has been to use a separate key for releasing the lock cylinder and another key for opening and closing the padlock. Still other methods have been used wherein the lock cylinder is enclosed by a pin either into the cylinder per se or into a cover plate as for example in U.S. Pat. Nos. 824,593 and 2,047,969. Still another method for securely enclosing the lock cylinder within the padlock body is by use of the shackle providing an interlock with the cover plate as demonstrated in U.S. Pat. Nos. 2,047,969 and 3,710,603. Both of these patents, however, have limitations.

For example, in U.S. Pat. No. 2,047,969 a retaining screw is required which can be tampered with to disable the padlock and in U.S. Pat. No. 3,710,603 the entire shackle [becomes free when the padlock is unlocked] *must be removed in order to remove the cover plate and the lock cylinder* giving rise to the padlock per se dropping to the ground and/or the shackle becoming contaminated in normal use of the padlock.

SUMMARY OF THE INVENTION

In the present invention a closure is provided in the top of the padlock body that is normally clamped over the opening in the padlock through which the lock cylinder can be removed. This closure can only be opened upon rotation to a certain predetermined position; however, in the locked position of the padlock a concave recess in the perimeter of the closure partially surrounds the shorter leg of the shackle, thereby providing an interlock so that the closure can not be opened until the leg of the shackle is within drawn in the unlocked position of the padlock. Unlike the arrangement shown in U.S. Pat. No. 3,710,603 the longer leg of the shackle can be pinned, or otherwise fastened within the body of the padlock, so that the entire shackle does not have to be withdrawn [,] *in order to remove the cover plate and the cylinder,* and the problem of damage and/or contamination of the padlock or shackle is eliminated.

DETAILED DESCRIPTION OF THE INVENTION

Figure 1:
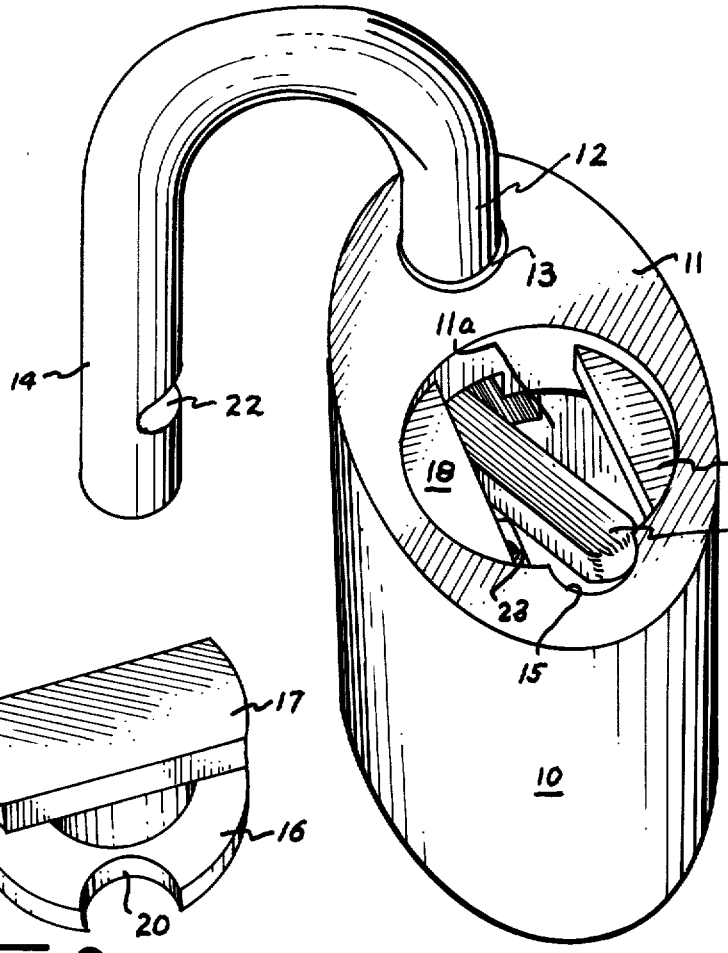
FIG. 1 is a perspective view of a padlock adapted to the closure of the invention.

Referring to FIG. 1 a padlock 10 having a top 11 has an opening 11a through which a lock cylinder (not shown) may be inserted and operated through a keyway having an opening on the bottom of the padlock (not shown). A shackle is provided having a leg 12 protruding through a socket 13 and a shorter leg 14, the longer leg 12 being pinned within the body of the padlock 10 to keep it from being withdrawn although it is free to pivot in its socket 13 as in conventional padlocks. The leg 14 is insertable for locking the padlock through a socket 15.

Figure 2:
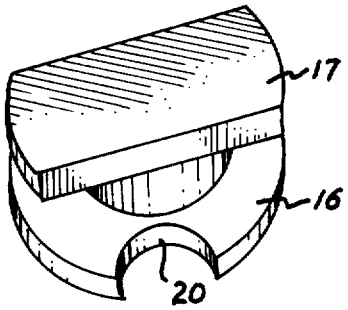
FIG. 2 shows the closure per se in perspective with the bayonet latching portion exposed, the closure being inverted from its normal position within the body of a padlock as shown in FIG. 1.
Figure 3:
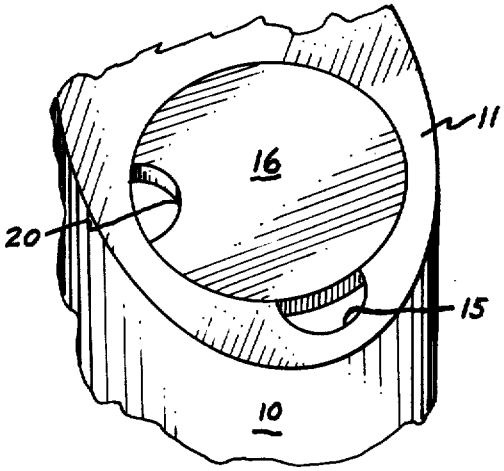
FIG. 3 illustrates the closure being in place in the top of the padlock body after the predetermined rotation required to permit its withdrawal from the opening into the padlock body—the shorter leg of the shackle (not shown) being withdrawn from its socket.
Figure 4:
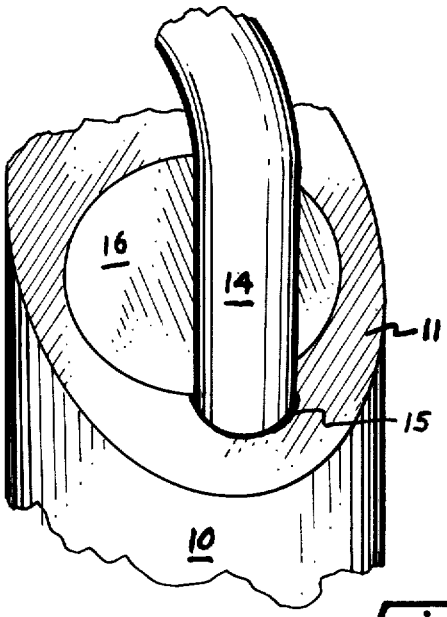
FIG. 4 shows in perspective the closure in its normally closed position and rotated to have the shorter leg of the shackle interlock rotation of the closure when the leg is inserted through its socket.

Referring also to FIG. 2 there is a shown a closure 16 of circular shape having a bayonet lug 17 spaced below the closure 16 and a concave recess 20 in the perimeter of the closure 16. It is to be noted that the drawing of FIG. 2 shows this construction inverted from its normal position in covering the opening 11a as shown in FIG. 3. The lug 17 cooperates with the shoulders 18 and 19 (see FIG. 1) to clamp the closure 16 in the top of the padlock 10, and the recess 20 partially surrounds the leg 14 at its socket 15 when the closure is in its clamped position (see FIG. 4). Since the closure 16 can only be removed from the top 11 of the padlock 10 (see FIG. 3) when the closure 16 is rotated approximately 90° from its position as shown in FIG. 4, it is effectively locked by the shackle leg 14 until the latter is withdrawn from its socket when the padlock is unlocked. Consequently, the lock cylinder contained within the body of the padlock 10 can not be removed from the opening 11a until the padlock is unlocked and the shorter leg 14 removed from its socket 15 and swung out of the way as in FIG. 1. (Note. For purposes of conserving space in the drawing of FIG. 1 the shackle leg 12, the longer leg is shown in its fully inserted position).

Attention is again invited to FIG. 1 wherein is shown the locking bolt 21 for coacting with a notch 22 in the shackle leg 14, a similar notch in leg 12 (not shown) coacting with the bolt 21, which is controlled by the lock cylinder—this being no part of this invention.

Referring again to FIG. 1 a spring urged ball 23 is arranged to bear against the labelled surface (as shown in FIG. 2) of the lug 17 when the closure 16 is inserted in the top 11 of the padlock 10 covering the opening 11a so that when the shorter leg 14 of the shackle is withdrawn from the padlock there is no inadvertant rotation of the closure 16 thereby making it awkward to re-insert the leg 14 to again lock the padlock. This spring urged detent may be a socket 18a formed in the shoulder 18 as shown by FIG. 5 having a spring 25 bearing against ball 23. Otherwise it might be necessary to re-align the closure 16 so that the leg 14 could be inserted through its socket 15 and the meshing of the recess 20 therewith.

The ball 23 may be spring urged through a hole 16, drilled through the closure 16 for latching the closure 16 in the position shown by FIG. 4, access to release the latch thereby being by the insertion of a wire or pin through the aforesaid hole, if more accurate registration of the closure 16 (actually the recess 20) is desired with socket 15.

What is claimed is:

1. In a padlock having a U-shaped shackle including a confined leg and a shorter non-confined leg protruding respectively from sockets in the top of the padlock, a body enclosing a detachably fixed lock cylinder removable through an opening in the top of the padlock, the top opening being of circular shape having a diameter less than the minimum distance between the shackle legs merging into an approximately semi-circular shape having a diameter just larger than that of the shorter shackle leg, the body portion including fixed bayonet coupling portion therein, a closure comprising a circular rotatable member for the opening having on its underside a bayonet coupling portion which cooperates with the bayonet coupling portion of the body and, the closure member on rotation sealing and closing the opening except for the shorter shackle leg opening portion thereof, so that when the padlock is locked the closure member is locked by the shorter shackle leg, and when the padlock is unlocked the shorter shackle leg only when removed allows the closure member to be removed for removal of the detachably fixed lock cylinder.

* * * * *